United States Patent
Nagler

(10) Patent No.: US 9,637,074 B2
(45) Date of Patent: May 2, 2017

(54) DRIVE ARRANGEMENT IN A MOTOR VEHICLE

(75) Inventor: Toni Nagler, Bamberg (DE)

(73) Assignee: Brose Fahrzeugteile GmbH & Co. KG, Hallstadt, Hallstadt (DE)

( * ) Notice: Subject to any disclaimer, the term of this patent is extended or adjusted under 35 U.S.C. 154(b) by 863 days.

(21) Appl. No.: 13/989,364

(22) PCT Filed: Nov. 17, 2011

(86) PCT No.: PCT/EP2011/005788
§ 371 (c)(1),
(2), (4) Date: Aug. 9, 2013

(87) PCT Pub. No.: WO2012/069159
PCT Pub. Date: May 31, 2012

(65) Prior Publication Data
US 2013/0342010 A1    Dec. 26, 2013

(30) Foreign Application Priority Data
Nov. 23, 2010    (DE) .................. 10 2010 052 045

(51) Int. Cl.
*B60L 1/00*    (2006.01)
*B60L 3/00*    (2006.01)
(Continued)

(52) U.S. Cl.
CPC ................ *B60R 16/03* (2013.01); *H02P 5/68* (2013.01); *H02P 7/04* (2016.02); *E05F 15/622* (2015.01);
(Continued)

(58) Field of Classification Search
CPC ........... B60R 16/03; H02P 7/0044; H02P 5/68
See application file for complete search history.

(56) References Cited

U.S. PATENT DOCUMENTS

| 6,593,711 B2 * | 7/2003 | Brereton ............. B60L 11/1805 |
| | | 318/34 |
| 8,766,563 B2 | 7/2014 | Eggelin et al. |

(Continued)

FOREIGN PATENT DOCUMENTS

| DE | 19639252 | 11/1997 |
| EP | 1154557 | 11/2001 |

(Continued)

OTHER PUBLICATIONS

International Preliminary Report on Patentability, for PCT/EP2011/005788 corresponding to U.S. Appl. No. 13/989,364, mailed May 28, 2013 (12 pages) with translation.

(Continued)

*Primary Examiner* — Rexford Barnie
*Assistant Examiner* — Rasem Mourad
(74) *Attorney, Agent, or Firm* — Pauly, Devries, Smith & Deffner, LLC

(57) ABSTRACT

The invention relates to a drive arrangement in a motor vehicle, wherein a first drive, a second drive and a third drive are provided, wherein the drives each have two supply connections, and wherein the first drive and the second drive each have their own associated driver circuit. The invention proposes that the supply connections of the third drive can be connected to high potential ($V_+$) and low potential ($V_-$) by means of the two driver circuits.

10 Claims, 4 Drawing Sheets

(51) Int. Cl.
*H02G 3/00* (2006.01)
*B60R 16/03* (2006.01)
*H02P 5/68* (2006.01)
*H02P 7/03* (2016.01)
*E05F 15/622* (2015.01)

(52) U.S. Cl.
CPC ..... *E05Y 2400/41* (2013.01); *E05Y 2900/546* (2013.01)

(56) References Cited

U.S. PATENT DOCUMENTS

2009/0279215 A1* 11/2009 Chang ................. H02H 7/0833
361/31
2011/0044669 A1* 2/2011 Leon ........................ H02P 5/68
388/829

FOREIGN PATENT DOCUMENTS

| GB | 2390943 | | 1/2004 | | |
|---|---|---|---|---|---|
| GB | 2390943 | A * | 1/2004 | .......... | B60L 11/1805 |
| SE | EP 1154557 | A1 * | 11/2001 | ................ | H02P 5/68 |

OTHER PUBLICATIONS

International Search Report and Written Opinion, for PCT/EP2011/005788 corresponding to U.S. Appl. No. 13/989,364, mailed May 21, 2012 (20 pages) with translation.
Consoli et al., "Sensorless Position Control of DC Actuators for Automotive Applications," Industry Applications Conference, Oct. 2004, pp. 1217-1224.
Examination Report for German co-pending patent application No. 102010052045.4, mailed Feb. 18, 2011 (3 pages).

* cited by examiner

DRIVE ARRANGEMENT IN A MOTOR VEHICLE

CROSS-REFERENCE TO RELATED APPLICATIONS

This application is a national stage application under 35 U.S.C. 371 of International Patent Application Serial No. PCT/EP2011/005788, entitled "Antriebsanordnung zur motorischen Verstellung einer Kappenanordnung," filed Nov. 17, 2011, which claims priority from German Patent Application No. 10 2010 052 045.4, filed Nov. 23, 2010, the disclosures of which are incorporated herein by reference.

FIELD OF THE INVENTION

The invention relates to a drive arrangement in a motor vehicle, and to a method for operating a drive arrangement.

BACKGROUND

The drive arrangement under discussion is used for the motorized adjustment of at least one adjustment element of a motor vehicle. In the present case, the term "adjustment element" is to be understood in a comprehensive fashion. Said term includes tailgates, trunk lids, doors, in particular side doors, storage-space floors or the like of a motor vehicle.

The drive arrangement under discussion is primarily used in tailgates and side doors in motor vehicles. Said drive arrangement is used for the motorized adjustment of the respective adjustment element in the closing direction and in the opening direction.

The known drive arrangement (WO 2010/083999 A1), on which the invention is based, is associated with a tailgate of a motor vehicle. The drive arrangement is equipped with two spindle drives which each have, in a compact physical unit, a drive motor, an intermediate gear mechanism with a clutch, and a spindle/spindle nut mechanism. A spring arrangement is provided in the respective physical unit, said spring arrangement counteracting the weight of the associated tailgate. The known drive arrangement also has a drive control means which is used to actuate the two drives, in particular the two drive motors.

The two drives, in particular the two drive motors, each have two associated supply connections which are selectively connected to a supply potential and ground via corresponding driver circuits. Two driver circuits are provided for the two drives, said driver circuits each being equipped as an H-bridge circuit. In particular, DC motors can be actuated in a bidirectional fashion in a simple manner with H-bridge circuits of this kind.

The drive arrangement under discussion generally also comprises a third drive which is associated, for example, with the motor vehicle lock of the tailgate, the door or the like. The third drive is a constituent part of a motorized closing aid which ensures that the respective adjustment element is pulled into the completely closed position against the seal counterpressure of the adjustment element seal. A closing aid drive of this kind is described, for example, in EP 1 550 784 B1.

A total of three drives are required for the adjustment of the tailgate, the door or the like overall, said drives each having their own driver circuit. This generally leads to an overall arrangement which is complicated in terms of control technology.

SUMMARY

The invention is based on the problem of providing a drive arrangement with three drive motors which can be realized with few control means.

The above problem is solved by a drive arrangement wherein a first drive, a second drive and a third drive are provided, wherein the drives each have two supply connections, and wherein the first drive and the second drive each have their own associated driver circuit by means of which the supply connections of the first drive and the supply connections of the second drive can be connected to high potential ($V_+$) and low potential ($V_-$), wherein a supply connection of the third drive is connected to a supply connection of the first drive and the other supply connection of the third drive is connected to a supply connection of the second drive, with the result that the supply connections of the third drive can be connected to high potential ($V_+$) and low potential ($V_-$) by means of the two driver circuits, wherein a logic unit is provided for actuating the driver circuits, and wherein the logic unit, for the purpose of actuating the first drive and the second drive, connects an identical potential to those supply connections of these drives which are connected to the supply connections of the third drive, and connects a control potential, in particular a pulsed control potential, to the other supply connections.

The knowledge that each of the drives does not have to be equipped with its own driver circuit in an arrangement comprising three drives is essential.

According to the proposal, provision is made for only the first drive and the second drive to each have their own driver circuit, wherein the third drive uses the driver circuits of the first two drives.

Specifically, the first drive and the second drive can be connected in the usual manner to high potential and ground by means of the two associated driver circuits.

It is now essential for a supply connection of the third drive to be connected to a supply connection of the first drive, and the other supply connection of the third drive to be connected to a supply connection of the second drive, with the result that the supply connections of the third drive can be connected to high potential and ground potential by means of the two driver circuits. A dedicated driver circuit for the third drive can be readily dispensed with by way of the solution according to the proposal.

The high potential is generally the supply potential of the motor vehicle, the low potential is generally the ground potential of the motor vehicle. However, in principle, the high potential and the low potential can also be controlled in a variable manner, in particular as a function of specific influence factors. In this respect, the terms "high potential" and "low potential" can be interpreted broadly.

It is particularly simple to implement the solution according to the proposal when the driver circuits are designed as H-bridge circuits. H-bridge circuits of this kind are generally made up of two half-bridges which are each available as half-bridge modules. As a result, the supply connections of the drives can be connected to high potential and low potential in a targeted manner.

According to the proposal, a logic unit is provided for actuating the driver circuits, said logic unit connecting the supply connections of the third drive to an identical potential when the first drive and the second drive are actuated. This ensures that there is no potential difference at the supply connections of the third drive while the other two drives are being adjusted in a motorized manner. Conversely, the drive control means connects in each case identical potentials to the supply connections of the first drive and the second drive while the third drive is being actuated. This can be realized in a particularly simple manner by the ability to actuate the switching outputs in a targeted manner in an H-bridge circuit.

The first drive and the second drive are preferably used for the motorized adjustment of the same adjustment element of the motor vehicle, specifically particularly the tailgate, the trunk lid, the engine hood, the door, in particular the side door, or the storage-space floor of the motor vehicle.

The third drive is further preferably used to adjust a further adjustment element, specifically particularly a lever or the like of a closing aid of a tailgate, a trunk lid, an engine hood, a door, in particular a side door, or a storage-space floor of the motor vehicle.

According to a further teaching, a method for operating the above drive arrangement as such is claimed.

It is essential, during actuation of the first drive and/or of the second drive, for the two supply connections of the third drive to be kept at an identical potential by corresponding actuation of the driver circuits, and/or, during actuation of the third drive, for the two supply connections of the first drive to be kept at an identical potential and for those of the second drive to be kept at an identical potential The advantages of the above method according to the proposal can be found in the explanations relating to the drive arrangement according to the proposal.

In an embodiment, the invention provides a drive arrangement in a motor vehicle, wherein a first drive, a second drive and a third drive are provided, wherein the drives each have two supply connections, and wherein the first drive and the second drive each have their own associated driver circuit by means of which the supply connections of the first drive and the supply connections of the second drive can be connected to high potential ($V_+$) and low potential ($V_-$), wherein a supply connection of the third drive is connected to a supply connection of the first drive and the other supply connection of the third drive is connected to a supply connection of the second drive, with the result that the supply connections of the third drive can be connected to high potential ($V_+$) and low potential ($V_-$) by means of the two driver circuits, wherein a logic unit is provided for actuating the driver circuits, and wherein the logic unit, for the purpose of actuating the first drive and the second drive, connects an identical potential to those supply connections of these drives which are connected to the supply connections of the third drive, and connects a control potential, in particular a pulsed control potential, to the other supply connections.

In one embodiment, the two driver circuits are designed as H-bridge circuits, in that the H-bridge circuits each have two half-bridges which are coupled to one another via a bridge arm, and in that the first two drives are connected by way of their supply connections into the bridge arm of the respective driver circuit.

In one embodiment, the half-bridges each have a high-side switch for connecting high potential ($V_+$) and, connected in series with said high-side switch, a low-side switch for connecting low potential ($V_-$), and in that the respective bridge arm starts from the coupling point between the switches.

In one embodiment, the first drive and the second drive are used for the motorized adjustment of an adjustment element of the motor vehicles.

In one embodiment, the adjustment element is designed as a tailgate, as a trunk lid, as an engine hood, as a door, in particular a side door, or as a storage-space floor of the motor vehicle.

In one embodiment, the third drive is used for the adjustment of a further adjustment element of the motor vehicle.

In one embodiment, the further adjustment element is designed as a constituent part of a closing aid of a tailgate, of a trunk lid, of an engine hood, of a door, in particular a side door, or a storage-space floor of the motor vehicle.

In one embodiment, during actuation of the first drive and/or of the second drive, the two supply connections of the third drive are kept at an identical potential by corresponding actuation of the driver circuits, and/or wherein, during actuation of the third drive, the two supply connections of the first drive are kept at an identical potential and the two supply connections of the second drive are kept at an identical potential.

In one embodiment, the first drive and the second drive act simultaneously on this adjustment element for the motorized adjustment of the adjustment element.

In one embodiment, the further adjustment element is designed as an adjustable lock latch of a motor vehicle lock or as an adjustable locking wedge or the like of a motor vehicle lock.

BRIEF DESCRIPTION OF THE FIGURES

The invention will be explained in greater detail with reference to a drawing which shows only one exemplary embodiment and in which.

DETAILED DESCRIPTION

Figure 1:
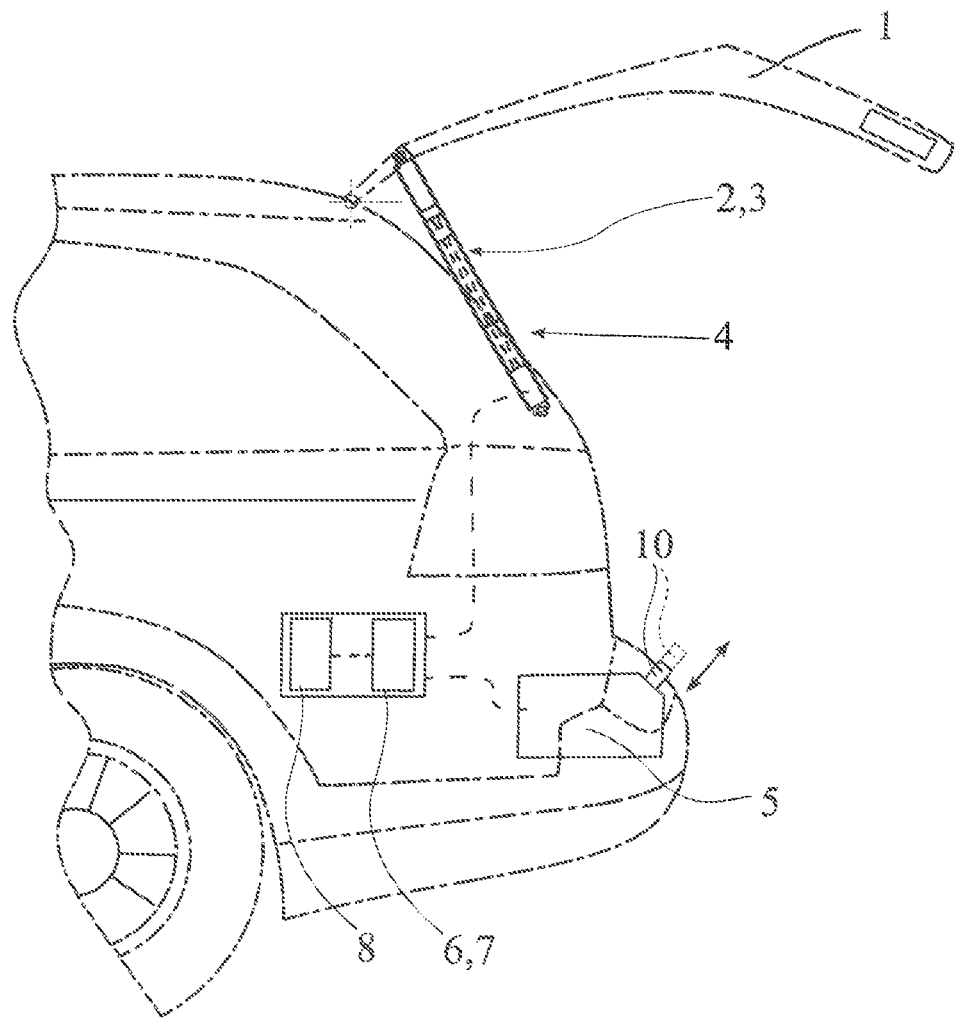
FIG. 1 shows a side view of the rear of a motor vehicle with a tailgate and a drive arrangement according to the proposal for the motorized adjustment of the tailgate.

The drive arrangement shown in FIG. 1 is used for the motorized adjustment of a tailgate 1 in a motor vehicle. However, all other adjustment elements which are mentioned in the introductory part of the description can also be advantageously used. All the following statements in respect of a tailgate accordingly apply to all the other adjustment elements mentioned there.

Figure 2:
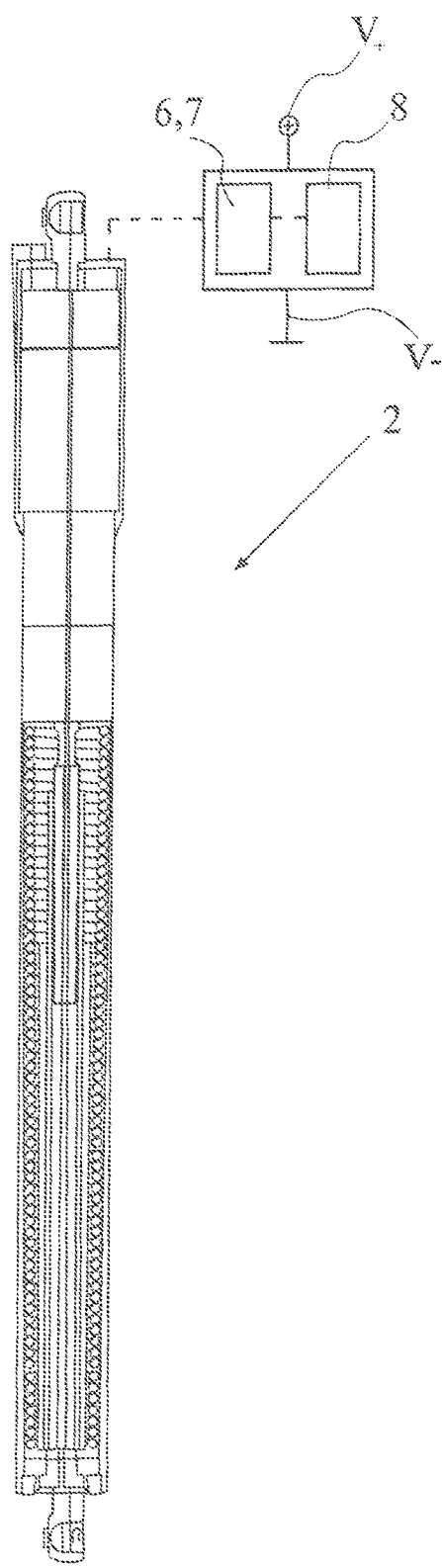
FIG. 2 shows a sectional illustration through one of the two drives of the drive arrangement according to FIG. 1.

The drive arrangement illustrated in FIG. 1 has a first associated drive 2 and a second associated drive 3, said drives each having a drive motor. The drives 2, 3 are arranged in the two side regions of a tailgate opening 4. FIG. 1 shows only one of the two drives 2, 3, specifically the drive 2 which is at the front in this view. FIG. 2 shows a sectional view of this drive 2.

Here and preferably, the two drives 2, 3 are of identical design. However, it is also feasible for the two drives 2, 3 to be of different design and, in particular, to have a different structure.

FIG. 1 shows, entirely schematically, a third drive 5 which, for its part, is equipped with a drive motor—not illustrated. This third drive 5 is a constituent part of a closing aid, as is still to be explained.

The drives 2, 3, 5 are preferably DC drives. This means that the drives 2, 3, 5 are each equipped with a DC motor. However, it is also feasible for AC motors to be used here.

The drives 2, 3, 5 usually each have two supply connections 2a, 2b and 3a, 3b which can be connected to high potential $V_+$ and low potential $V_-$. The terms "high potential" and "low potential" are intended to be interpreted broadly as described above.

Nowadays, DC drives 2, 3, 5 of this kind are usually actuated with a pulsed control potential. A pulse-width-modulated (PWM) control potential has become particularly prevalent for this purpose. In this case, a supply connection 2a, 3a, 5a is applied to high potential $V_+$ or low potential $V_-$, while the respectively other supply connection 2b, 3b, 5b, is connected to a pulsed control potential. Numerous other variants are feasible for actuating the drives 2, 3, 5.

Figure 3:
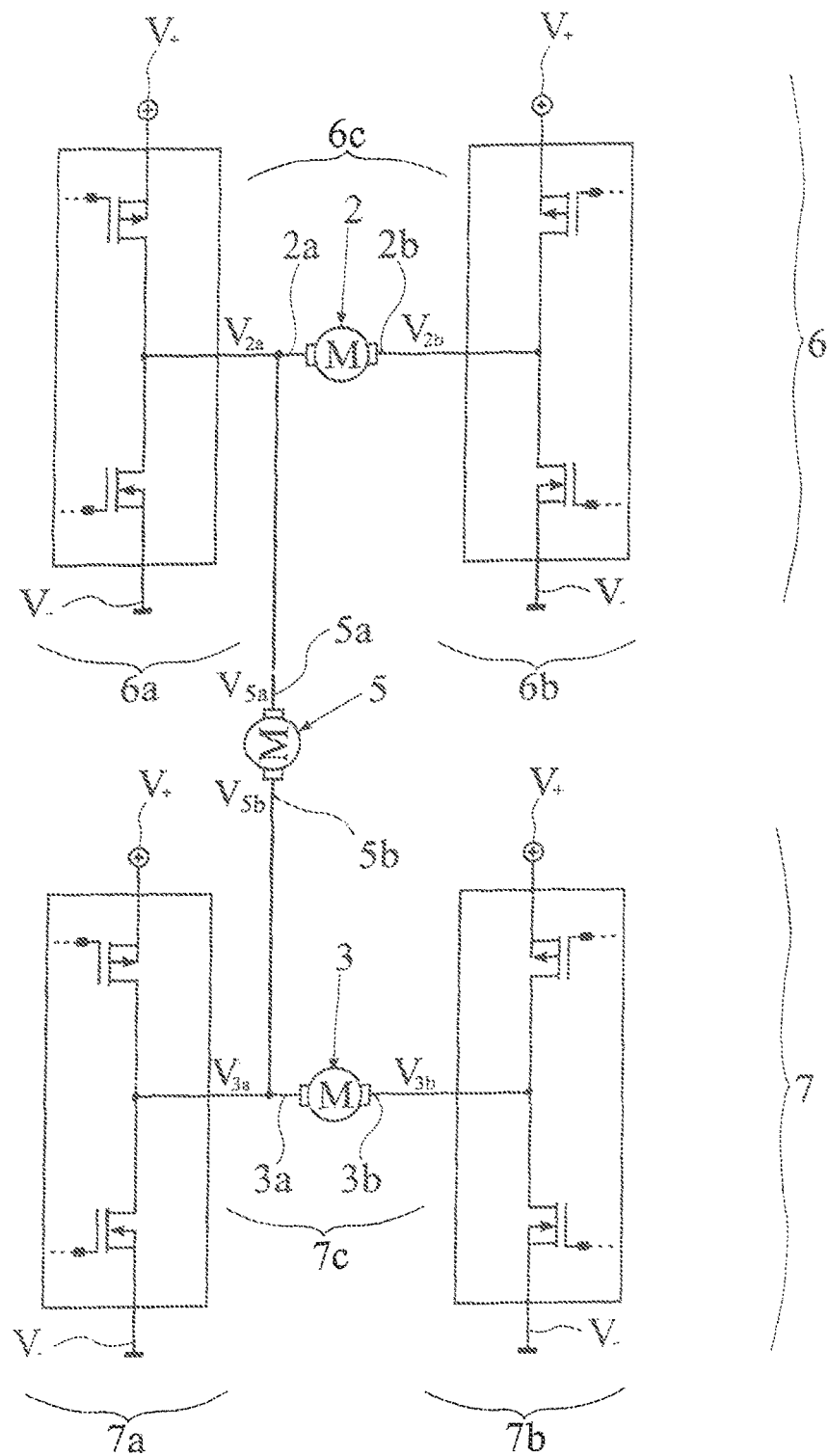
FIG. 3 shows an entirely schematic illustration of the two driver circuits of the drive arrangement according to the proposal according to claim 1.

The illustration in FIG. 3 shows that the first drive 2 and the second drive 3 each have their own associated driver circuit 6, 7 by means of which the supply connections 2a, 2b, 3a, 3b of the first drive 2 and of the second drive 3 can be connected to high potential $V_+$ and low potential $V_-$.

The formulation "their own" driver circuit means that the first drive 2 and the second drive 3 can be controlled separately from one another, with the result that the two drives 2, 3 are, for example, not only connected in parallel.

The fact that a supply connection 5a of the third drive 5 is connected to a supply connection 2a of the first drive 2 and the other supply connection 5b of the third drive 5 is connected to a supply connection 3a of the second drive 3, specifically such that the supply connections 5a, 5b of the third drive 5 can be connected to high potential $V_+$ and low potential $V_-$ by means of the two driver circuits 6, 7, is of particular importance here. The specific manner in which this is provided will be explained after the circuitry-related details are explained.

FIG. 3 shows that the two driver circuits 6, 7 are designed as H-bridge circuits, wherein the H-bridge circuits each usually have two half-bridges 6a, 6b and 7a, 7b. The half-bridges 6a, 6b and 7a, 7b are each coupled to one another by means of a bridge arm 6c, 7c, wherein the first two drives 2, 3 are connected by way of their supply connections 2a, 2b and 3a, 3b into the bridge arm 6c, 7c of the respective driver circuit 6, 7.

According to the proposal, the third drive 5 is then connected by way of its supply connections 5a, 5b to the bridge arms 6c, 7c of the driver circuits 6, 7.

The half-bridges 6a, 6b and 7a, 7b each have a high-side switch (in each case the upper switch within a half-bridge 6a, 6b, 7a, 7b in FIG. 3) for connecting high potential $V_+$ and, connected in series with said high-side switch, a low-side switch (in each case the lower switch within a half-bridge 6a, 6b, 7a, 7b in FIG. 3) for connecting low potential $V_-$, wherein the respective bridge arm 6c, 7c starts from the coupling point between the two switches. The switches within the half-bridges 6a, 6b, 7a, 7b may be any desired switches. However, MOSFET switches are used here and preferably, wherein the low-side switches are N-channel MOSFETS and the high-side switches are P-channel MOSFETS. The gate connections of the switches are each coupled to a logic unit 8 which is combined with the two driver circuits 6, 7 to form a drive control means for the drive arrangement.

The logic unit 8 is used to actuate the driver circuits 6, 7. To this end, the logic unit 8 correspondingly connects the gate connections of the switches of the half-bridges 6a, 6b, 7a, 7b.

Figure 4:
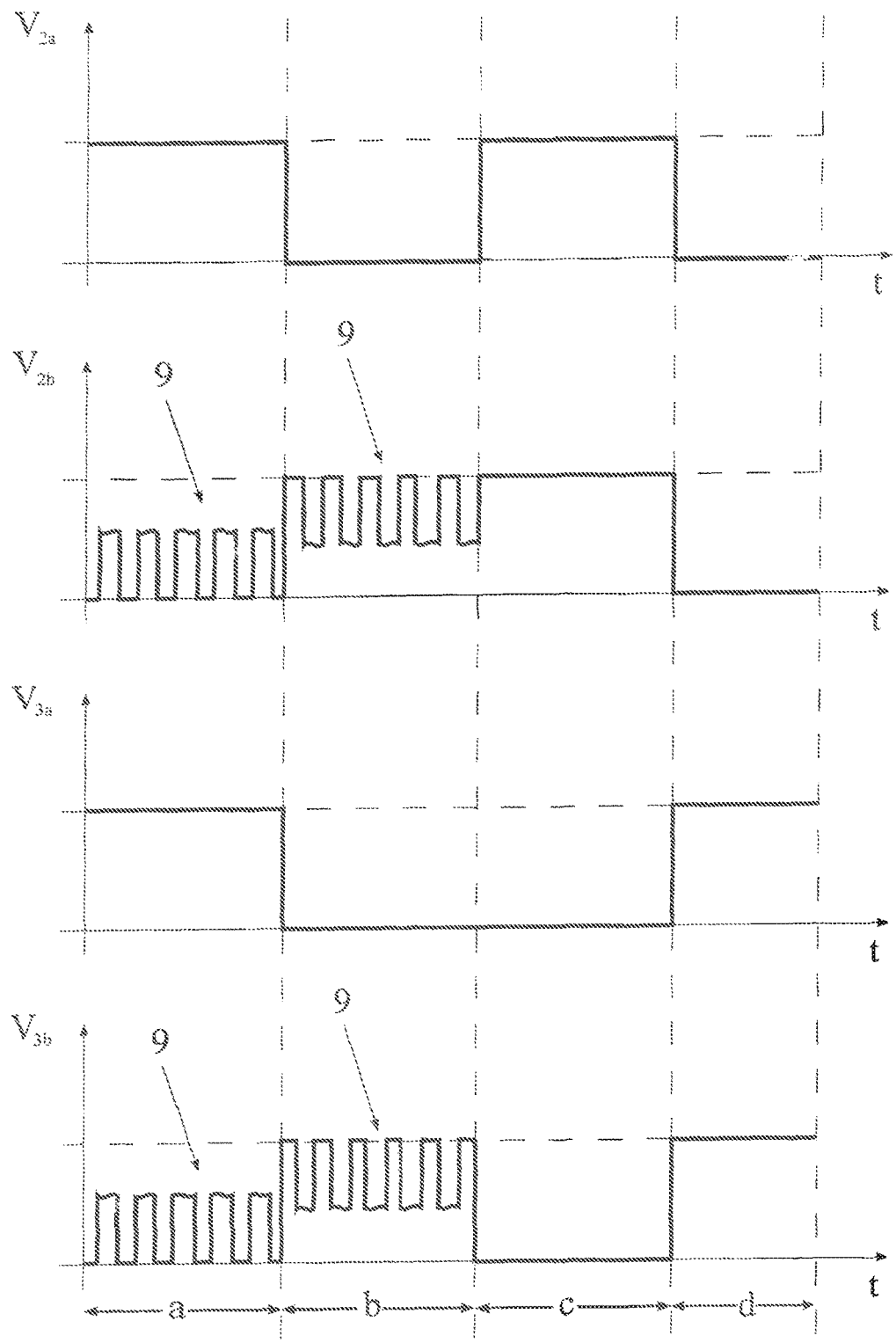
FIG. 4 shows the time profiles of the potentials which are applied to the supply connections of the first drive and of the second drive.

An exemplary time profile for the actuation of the driver circuits 6, 7 is shown in FIG. 4. In said figure, the potentials $V_{2a}, V_{2b}, V_{3a}, V_{3b}$ are plotted against time t. Said potentials correspond to the potentials which are applied to the supply connections 2a, 2b, 3a, 3b. In this case, the potentials $V_{2a}$ and $V_{3a}$ correspond to the potentials $V_{5a}$ and $V_{5b}$.

The actuation of the first drive 2 and of the second drive 3 is shown in time segments "a" and "b" according to FIG. 4. In this case, the supply connections 2a, 3a of said drives 2, 3 which are connected to the supply connections 5a, 5b of the third drive 5 are connected to an identical potential, specifically to high potential $V_+$ in time segment "a" and to low potential $V_-$ in time segment "b". This means that the third drive 5 is not actuated in time segments "a" and "b".

"Actuation" of the drives 2, 3, 5 means the state in which connection of the drives 2, 3, 5 by means of the driver circuits 6, 7 generates a controlled drive movement of at least one of the drives 2, 3, 5. If the two supply connections of a drive 2, 3, 5 are connected to an identical potential, actuation in the above sense does not take place since the potential difference which is required for the motorized movement is accordingly not present at the respective supply connections.

The other supply connections 2b, 3b of the first two drives 2, 3 are connected to a control potential, which is designed in particular as a pulsed control potential 9, in the time segments "a" and "b". The control potential 9 may be, as explained above, a PWM control potential. In time segment "a", the control potential 9 is a pulsed low potential $V_-$ which provides a corresponding potential difference to the supply connections 2a, 3a. The first two drives 2, 3 are correspondingly adjusted in a first movement direction.

The reverse situation is shown in time segment "b". In this case, the supply connections 2a, 3a and therefore the supply connections 5a, 5b are at low potential $V_-$, with the result that the third drive 5 is again not actuated. However, the supply connections 2b, 3b are connected to a pulsed control potential, in this case with a pulsed high potential $V_+$, with the result that the first two drives 2, 3 move in the opposite direction.

The above connection of the supply connections 2b, 3b to a pulsed control potential means that the respective control potential is connected to the respective supply connections 2b, 3b and is again disconnected from the respective supply connection 2b, 3b within one PWM period. The potential which is established at the respective supply connection 2b, 3b in the disconnected state can assume different values which depend, in particular, on the design of the drives, 2, 3. This potential is accordingly indicated with a break-off line in FIG. 4. However, here and preferably, the potential at the supply connections 2b, 3b alternates between the low potential $V_-$ and high potential $V_+$ in the time segments "a" and "b".

It was possible to show that it is readily possible to actuate the first two drives 2, 3 with the circuit according to the proposal, without the third drive 5 being actuated.

If the third drive is intended to be actuated, it is necessary to ensure that the supply connections 2a, 2b and 3a, 3b of the first two drives 2, 3 are connected to an identical potential, with the result that the first two drives 2, 3 are not actuated. This is shown in time segments "c" and "d".

In the time segment "c", the supply connection 2a and therefore the supply connection 5a is at high potential $V_+$ whereas the supply connection 3a and therefore the supply connection 5b is at low potential $V_-$. Therefore, the third drive 5 can be actuated with an unpulsed DC voltage in a first movement direction. Conversely, provision is made in time segment "d" for the supply section 2a and therefore the supply section 5a to be connected to low potential $V_-$ and for the supply section 3a and therefore the supply section 5b to be connected to high potential $V_+$. Accordingly, the third drive 5 is actuated in the reverse movement direction with an unpulsed DC voltage. The first two drives 2, 3 remain unactuated during the actuation of the third drive 5 owing to the connection of the supply connections 2a, 2b and 3a, 3b to an identical potential in each case.

The illustration according to FIG. 1 shows a drive arrangement in which the first drive 2 and the second drive 3 are used for the motorized adjustment of a single adjustment element 2 of the motor vehicle and here and preferably act simultaneously on said adjustment element 1 for the motorized adjustment of the adjustment element 1. However, provision can be made, in principle, for the first drive 2 and the second drive 3 to be associated with different actuating elements independently of one another.

However, in a particularly preferred refinement, the adjustment element 1 which is associated with the two drives 2, 3 is designed as a tailgate, as a trunk lid, as an engine hood, as a door, in particular a side door, or as a storage-space floor of the motor vehicle. Other variants of the adjustment element are feasible.

The third drive 5 is used, in contrast, as indicated further above, for the motorized adjustment of a further adjustment element 10 of the motor vehicle, here the closing aid of a tailgate, a trunk lid, an engine hood, a door, in particular a side door, or a storage-space floor of the motor vehicle. In this case, the further adjustment element 10 is preferably a constituent part of the closing aid. It is feasible for the further adjustment element 10 to be the adjustable lock catch of a motor vehicle lock. However, here and preferably, the further adjustment element is designed as an adjustable locking wedge 10 or the like of a motor vehicle lock. The illustration in FIG. 1 shows that the locking wedge 10 can be moved to an extended preliminary locking position and to a retracted main locking position by means of the third drive 5. The adjustment of the locking wedge from the preliminary locking position to the main locking position is linked, in a manner which is known per se, with a corresponding closing of the tailgate 1 or the like against the seal counterpressure.

The described method for operating the drive arrangement according to the proposal as such is claimed according to a further teaching, which is likewise given independent significance.

It is essential that, during actuation of the first drive 2 and/or of the second drive 3, the two supply connections 5a, 5b of the third drive 5 are kept at an identical potential by corresponding actuation of the driver circuits 6, 7. As an alternative or in addition, provision may be made, during actuation of the third drive 5, for the two supply connections 2a, 2b of the first drive 2 and the two supply connections 3a, 3b of the second drive 3 to in each case be kept at an identical potential. Reference may be made to all the above embodiments which are suitable for describing the above method.

The invention claimed is:

1. A drive arrangement in a motor vehicle,
wherein a first drive, a second drive and a third drive are provided,
wherein the drives each have two supply connections, and
wherein the first drive and the second drive each have their own associated driver circuit configured to connect the supply connections of the first drive and the supply connections of the second drive to high potential ($V_+$) and low potential ($V_-$),
wherein a supply connection of the third drive is connected to a supply connection of the first drive and the other supply connection of the third drive is connected to a supply connection of the second drive, such that the two driver circuits are configured to connect the supply connections of the third drive to high potential ($V_+$) and low potential ($V_-$),
wherein a logic unit is provided for actuating the driver circuits,
wherein the logic unit is configured to actuate the first drive and the second drive, without actuating the third drive, by connecting an identical potential to the supply connections of the first and second drives that are connected to the supply connections of the third drive, and by connecting a control potential to the other supply connections of the first and second drives,
wherein the logic unit is configured to keep the two supply connections of the first drive at an identical potential and the two supply connections of the second drive at an identical potential during actuation of the third drive, and
wherein during the actuation of the third drive, the logic unit is configured to keep the two supply connections of the first drive at one of the high potential and the low potential and to keep the two supply connections of the second drive at the other of the high potential and the low potential.

2. The drive arrangement as claimed in claim 1, wherein the two driver circuits are designed as H-bridge circuits, wherein the H-bridge circuits each have two half-bridges which are coupled to one another via a bridge arm, and wherein the first two drives are connected by way of their supply connections into the bridge arm of the respective driver circuit.

3. The drive arrangement as claimed in claim 2, wherein the half-bridges each have a high-side switch for connecting high potential ($V_+$) and, connected in series with said high-side switch, a low-side switch for connecting low potential ($V_-$), and wherein the respective bridge arm starts from the coupling point between the switches.

4. The drive arrangement as claimed in claim 1, wherein the first drive and the second drive are used for the motorized adjustment of an adjustment element of the motor vehicle.

5. The drive arrangement as claimed in claim 4, wherein the adjustment element is designed as a tailgate, as a trunk lid, as an engine hood, as a door, as a side door, or as a storage-space floor of the motor vehicle.

6. The drive arrangement as claimed in claim 1, wherein the third drive is used for the adjustment of a further adjustment element of the motor vehicle.

7. The drive arrangement as claimed in claim 6, wherein the further adjustment element is designed as a constituent part of a closing aid of a tailgate, of a trunk lid, of an engine hood, of a door, of a side door, or a storage-space floor of the motor vehicle.

8. The drive arrangement as claimed in claim 4, wherein the first drive and the second drive act simultaneously on the adjustment element for the motorized adjustment of the adjustment element.

9. The drive arrangement as claimed in claim 7, wherein the further adjustment element is designed as an adjustable lock latch of a motor vehicle lock or as an adjustable locking wedge of a motor vehicle lock.

10. The drive arrangement as claimed in claim 1, wherein one supply connection of the third drive is directly connected to one of the supply connections of the first drive and the other supply connection of the third drive is directly connected to one of the supply connections of the second drive.

* * * * *